(12) United States Patent  
Hirano

(10) Patent No.: US 7,481,510 B2  
(45) Date of Patent: Jan. 27, 2009

(54) IMAGE FORMING APPARATUS, IMAGE PROCESSING METHOD, AND PRINTER DRIVER

(75) Inventor: Masanori Hirano, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 306 days.

(21) Appl. No.: 11/105,891

(22) Filed: Apr. 14, 2005

(65) Prior Publication Data

US 2005/0231742 A1    Oct. 20, 2005

(30) Foreign Application Priority Data

Apr. 19, 2004 (JP) .............................. 2004-122361  
Jan. 19, 2005 (JP) .............................. 2005-011018

(51) Int. Cl.
*B41J 2/205* (2006.01)  
*G06K 1/00* (2006.01)

(52) U.S. Cl. .......................................... 347/15; 358/1.2

(58) Field of Classification Search .................. 347/15, 347/43; 358/1.2, 1.9  
See application file for complete search history.

(56) References Cited

U.S. PATENT DOCUMENTS 6,084,604 A * 7/2000 Moriyama et al. ............ 347/15  
6,543,872 B2 * 4/2003 Ohtsuka et al. ............... 347/19  
6,862,107 B1 * 3/2005 Kawai ........................ 358/1.18  
7,036,907 B2 * 5/2006 Jung et al. .................... 347/43  
2003/0090686 A1 * 5/2003 Fujimori ..................... 358/1.8

FOREIGN PATENT DOCUMENTS

| JP | 6-171072 | 6/1994 |
|----|----------|--------|
| JP | 11-112823 | 4/1999 |
| JP | 11-150652 | 6/1999 |
| JP | 2000-355159 | 12/2000 |
| JP | 2001-352453 | 12/2001 |
| JP | 2002-10090 | 1/2002 |
| JP | 2002-281302 | 9/2002 |

* cited by examiner

*Primary Examiner*—Lamson D Nguyen  
(74) *Attorney, Agent, or Firm*—Cooper & Dunham, LLP

(57) ABSTRACT

An image forming apparatus for reproducing a black color by using an ink other than a black ink when recording an image on a recording medium is disclosed. The image forming apparatus includes an image processing part for disposing dots of multiple colors in various gradation levels, the image processing part being configured to dispose the dots of each color in a predetermined gradation level at a same position.

17 Claims, 16 Drawing Sheets

(a) 12.5%

(b) 25%

(c) 37.5%

HEAD MOVING DIRECTION
(MAIN SCANNING DIRECTION)

SHEET DELIVERY DIRECTION
(SUB SCANNING DIRECTION)

FIG.4
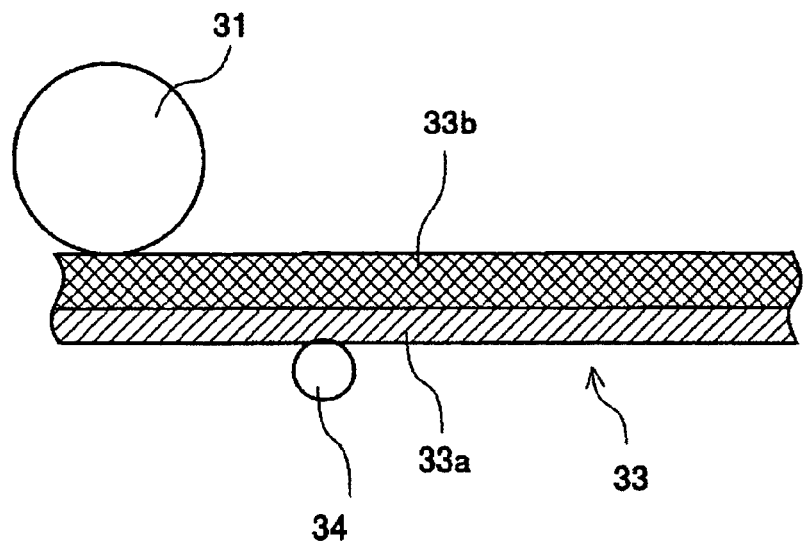
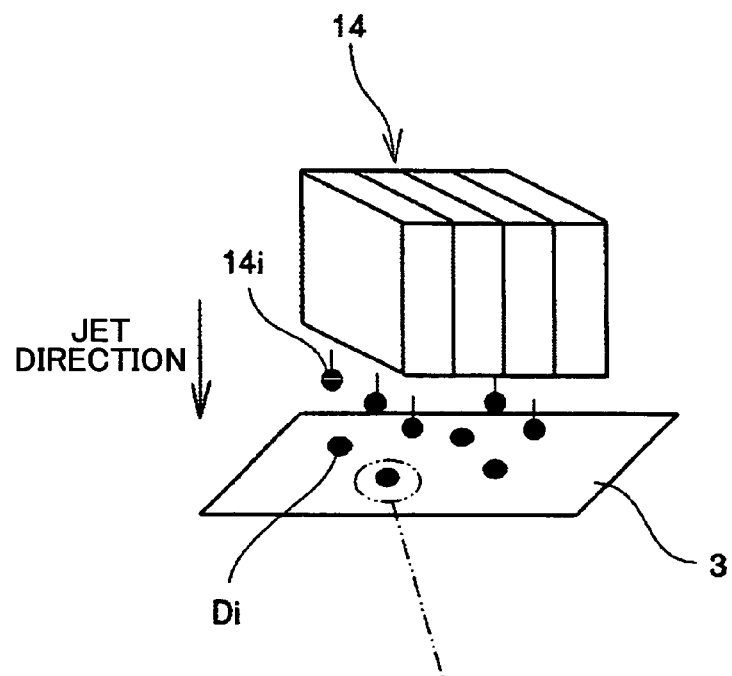
FIG.5A
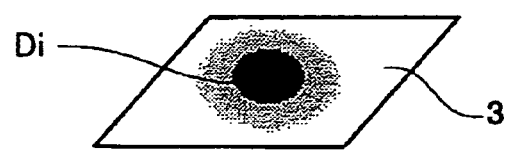
FIG.5B

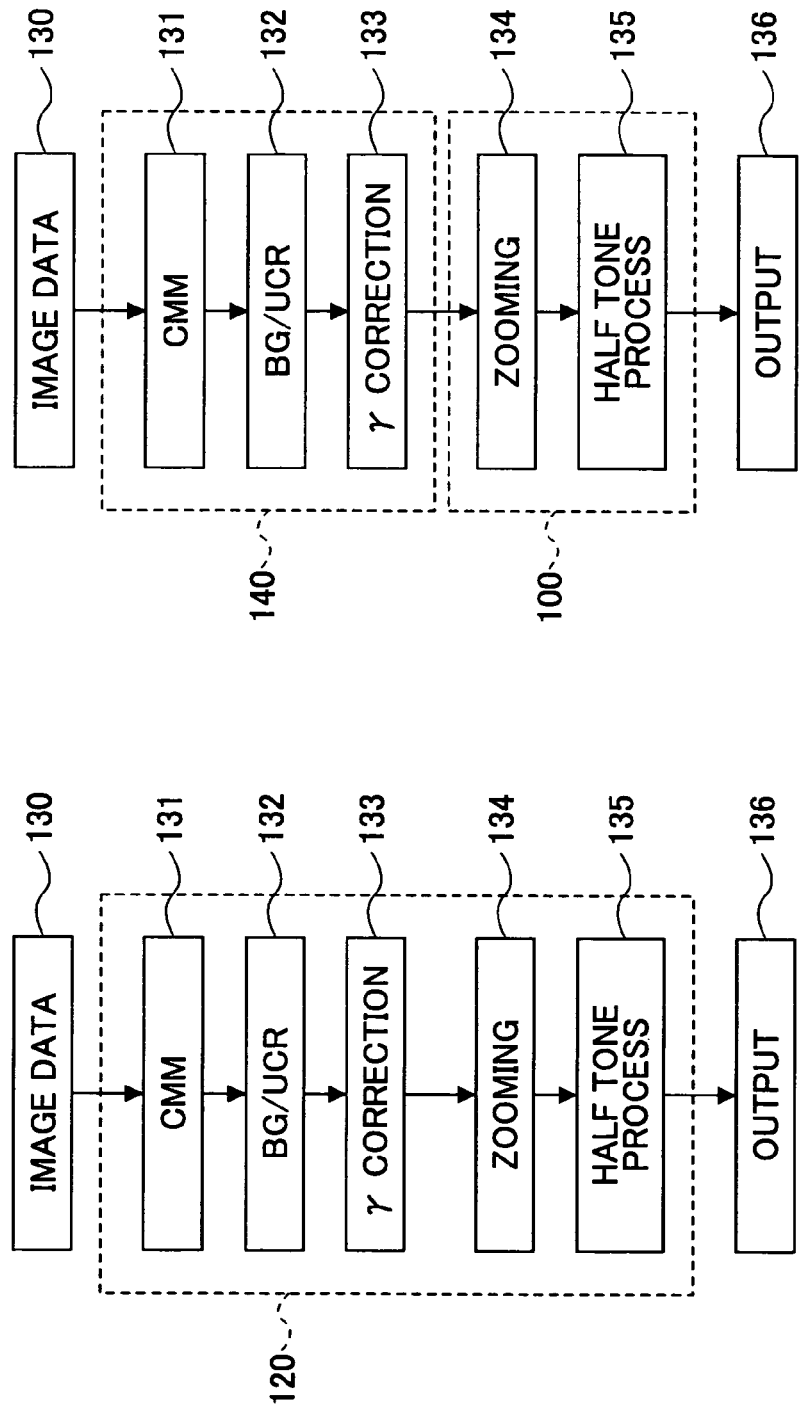

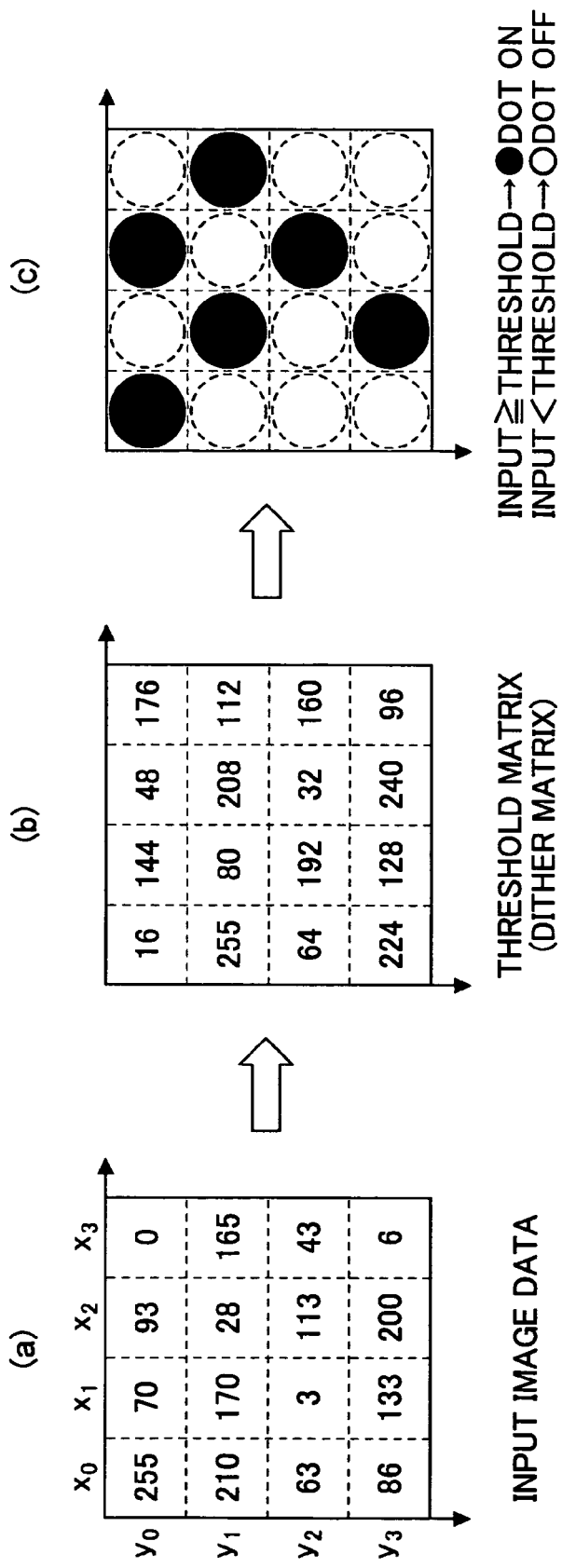

FIG.10

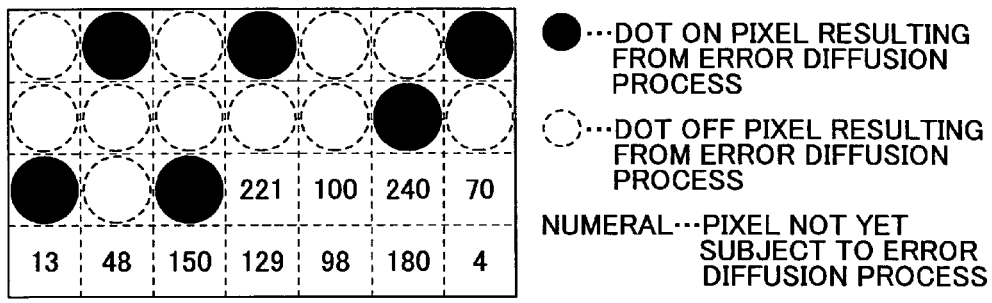

● ···DOT ON PIXEL RESULTING FROM ERROR DIFFUSION PROCESS

○ ···DOT OFF PIXEL RESULTING FROM ERROR DIFFUSION PROCESS

NUMERAL···PIXEL NOT YET SUBJECT TO ERROR DIFFUSION PROCESS

⇩

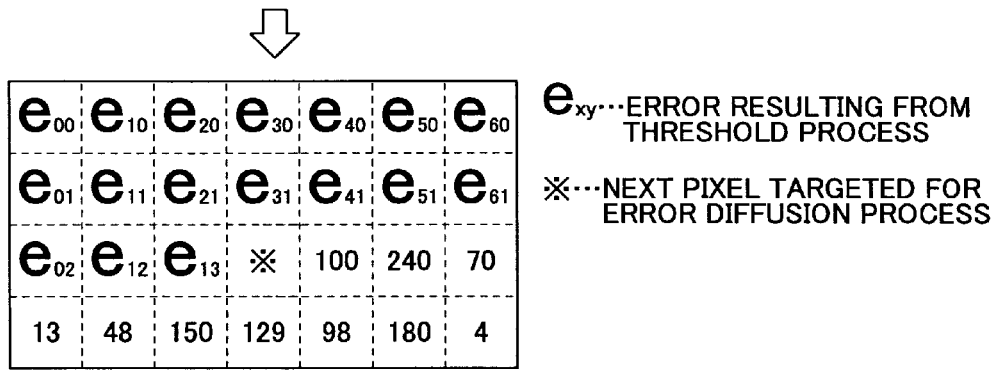

$e_{xy}$···ERROR RESULTING FROM THRESHOLD PROCESS

※···NEXT PIXEL TARGETED FOR ERROR DIFFUSION PROCESS

⇩

MULTIPLY BELOW WEIGHT WITH ERROR VALUE OF SURROUNDING PROCESSED PIXEL
→ ADD MULTIPLICATION RESULT TO TARGET PROCESS PIXEL
→ OBTAIN PIXEL CORRECTION VALUE

ERROR WEIGHT MATRIX $\frac{1}{48}$ ×

| 1 | 3 | 5 | 3 | 1 |
|---|---|---|---|---|
| 3 | 5 | 7 | 5 | 3 |
| 5 | 7 | ※ | | |

※···NEXT PIXEL TARGETED FOR ERROR DIFFUSION PROCESS

PIXEL CORRECTION VALUE = $221 + \frac{1}{48}e_{10} + \frac{3}{48}e_{20} + \frac{5}{48}e_{30} + \cdots + \frac{7}{48}e_{13}$

⇩

COMPARE FIXED (or VARYING) THRESHOLD AND PIXEL CORRECTION VALUE
→OBTAIN DOT ON/OFF AND ERROR VALUE (255=SOLID, 0=PLAIN)

if PIXEL CORRECTION VALUE > THRESHOLD
      $e_{xy}$ = PIXEL CORRECTION VALUE − 255   ···DOT ON
   else
      $e_{xy}$ = PIXEL CORRECTION VALUE   ···DOT OFF

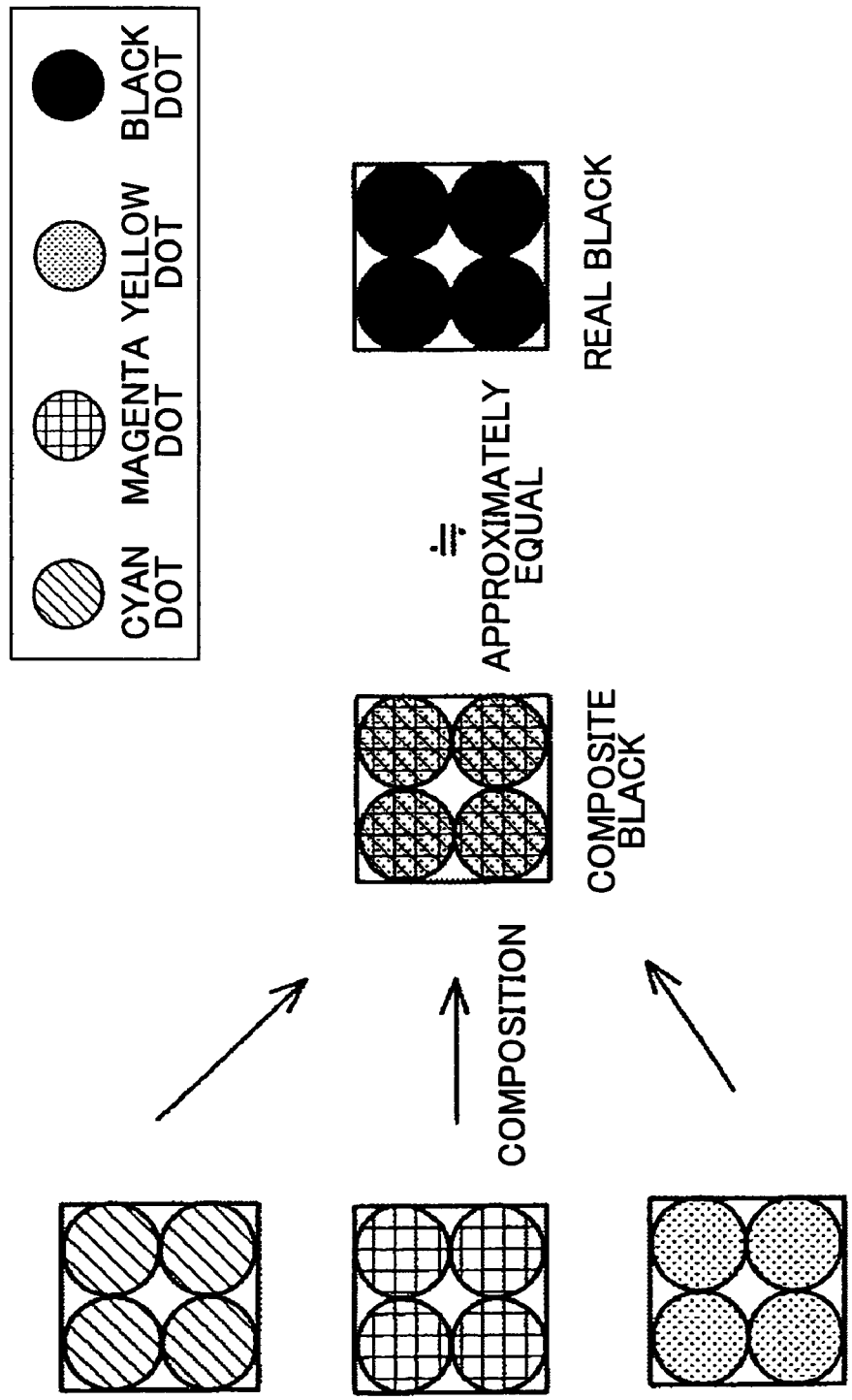

FIG.15
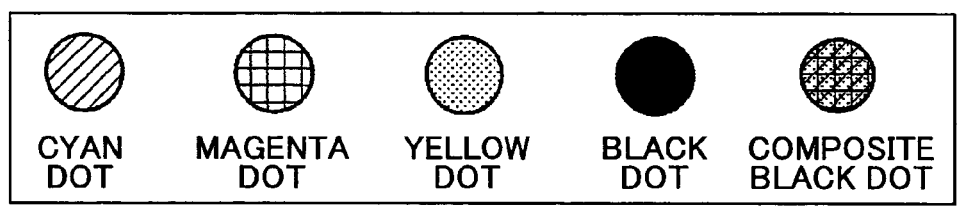
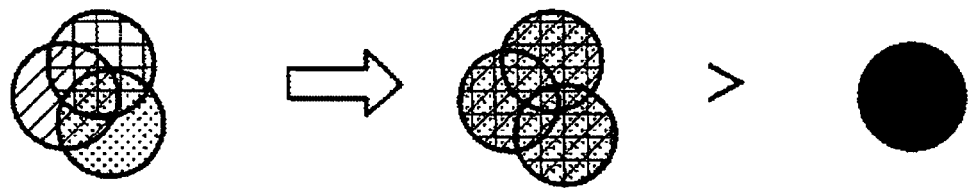
RECOGNIZE AS LARGE SIZE

IMAGE FORMING APPARATUS, IMAGE PROCESSING METHOD, AND PRINTER DRIVER

BACKGROUND

1. Technical Field

This disclosure relates to an image forming apparatus, an image processing method, and a printer driver, and more particularly to an image forming apparatus, an image processing method, and a printer driver that reproduce black by using a color ink besides black ink or by mixing black ink and a color ink besides black ink.

2. Description of the Related Art

As for known image forming apparatuses, there are printers, facsimile machines, copiers, and complex apparatuses thereof. One example of such image forming apparatuses is an inkjet recording apparatus which is able record high definition images at high speed by jetting ink from an ink recording head to a recording medium (a medium on which ink (recording liquid) is applied including, for example, paper, transfer paper, OHP sheet).

The inkjet recording apparatus, at first, grew to widespread spread use owing to its inexpensiveness and ability to generate high quality images by using a predetermined paper. Currently, however, electrophotographic type laser printers, which are employed in offices, are employed as recording apparatuses for outputting color images.

Typically, the ink used for the inkjet recording apparatus contains water as a main component, a color agent, and a wetting agent (glycerin) for preventing clogging. The color agent includes dyes and pigments. A dye type ink is often employed for coloring color areas from the aspect of satisfactory color property and stability.

Images obtained by the dye type ink are inferior compared to those obtained by a pigment type ink from the aspect of fastness property (e.g. light fastness, water resistance). Although water resistance of the images obtained by the dye type ink may be improved to some extent by employing an inkjet dedicated recording paper which includes an ink absorbing layer, satisfactory results cannot be attained by printing on plain paper.

In order to alleviate such problems which occur in recording with dye type ink on plain paper, the use of pigment type ink including organic pigment, carbon black, etc., is proposed or put into practical use. Since pigment does not have the same water solubility as dye, the pigment is normally mixed with a dispersant, is subject to a dispersion process in water, and is provided as an aqueous ink upon reaching a stable dispersed state.

Although improved light fastness and water resistance can be attained by using the pigment, it is difficult to obtain satisfactory image density, color property, and color reproducibility, etc., especially in a case of performing high speed printing on plain paper. Furthermore, the use of the pigment has problems such as character bleeding, color boundary bleeding, and unsatisfactory performance in double side printing and ink drying property (fixing property).

One example for solving the problems occurring in a case of printing with pigment type ink on plain paper is shown in Japanese Laid-Open Patent Application No.6-171072. In this example, an ink containing a pigment, a polymer dispersant, and a resin emulsion is employed, in which the amount of solid matter to be adhered to a corresponding area on a recording paper is adjusted under a condition of 100% duty printing. This example reduces creation of uneven print areas due to cohesion of pigment regardless of the type of paper. Furthermore, this example provides an image having high print density without print character bleeding.

Another example for solving the problems occurring in a case of printing with pigment type ink on plain paper is shown in Japanese Laid-Open Patent Application No.2000-355159. In this example, an ink containing a surface processed pigment and a penetrating agent as its components is employed, in which the amount of the ink to be jetted to a corresponding area in a recording medium is adjusted. The use of this ink enables reduction of irregular bleeding, fast drying of ink on the recording medium, attaining of a high print density and satisfactory print image.

The first example disclosed in Japanese Laid-Open Patent Application No.6-171072 is able to improve print density and reduce character bleeding since the ink in this example provides a considerably high contact angle equal to or greater than 70 degrees with respect to a predetermined paper such as plain paper. However, in a case of performing 100% duty printing on a recording paper, the necessary amount of solid material to be adhered to a corresponding area is approximately several tens of $ng/m^2$. This is undesirable from the aspect of ink fixing property (drying property). More particularly, in a case of repetitively printing a large amount of paper at high speed, stains are created between the sheets of paper. Therefore, this example is unsuitable for high speed printing. Furthermore, in performing 100% duty printing, white streaks may be created at plain parts and character parts of the paper due to the high contact angle. Furthermore, owing to the high contact angle, color bleeding easily occurs between adjacent printed dots in color boundary portions of the recording paper.

The second example disclosed in Japanese Laid-Open Patent Application No.2000-355159 is advantageous from the aspect of ink drying property (fixing property) since it employs a penetrating agent. Furthermore, this example is suited for high speed printing since no stains are created in a case of printing a large amount of paper at high speed. However, since the ink in this example contains a penetrating agent, character bleeding is caused in a case of printing on plain paper. More particularly, since the ink penetrates the plain paper in a depthwise direction, this example is unsuitable for double side printing on plain paper.

As another example for solving the problems in using pigment type ink for printing on plain paper, there is an ink containing at least a pigment, a water soluble organic solvent, a polyol with a carbon number of 8 or more or glycol ether, and water. This example proposes to provide (1) satisfactory color tone (sufficient coloring property, color reproducibility), (2) high image density, (3) clear images without feathering or color bleeding of characters and images, (4) sufficient endurance for performing double side printing without ink penetrating through to the back of the paper, (5) high drying property suitable for high speed printing, and (6) satisfactory fastness property (e.g. light fastness, water resistance).

Although laser printers, conventionally, were predominantly used for printing on plain paper, inkjet printers are currently able to print likewise high quality images on plain paper as a result of experiments and research with the pigment type ink. Therefore, inkjet printers are widely used in offices owing to their low cost and ease of maintenance.

There is, however, still a demand for printing high quality images on paper dedicated for inkjet printing. In addition to the widespread use of digital scanners, high quality digital cameras are widely used. Therefore, common users are able to manipulate data of high quality images and use the dedicated paper (particularly, glossy paper providing a glossiness on the paper surface) for outputting images with a quality corresponding to that of the input data.

However, the pigment type ink developed for improving image quality for printing on plain paper is not necessarily suitable for printing on glossy paper. That is, although the glossy paper has applied a coating for absorbing ink and providing glossiness to the paper surface, pigment type ink tends to cause pigment components to accumulate on the surface of the coating. The accumulation of the pigment components causes the recording surface to lose its glossiness and also causes dried up pigment components to peel from the paper surface.

In order to solve this problem, there is one widely used method of employing a dye type ink as a color ink and a pigment type ink as a black ink. There is also another method of providing a pigment type ink adjusted for glossy paper and a pigment type ink adjusted for plain paper. The latter method, however, uses a large amount of space for mounting a head unit or an ink cartridge, and is therefore difficult to employ for an apparatus used for commonly used paper (e.g. A4 size paper).

There is also a method of employing an intermediate ink which is adjusted to be applicable for both glossy and plain paper. This method, however, demonstrates a half measure image quality which is unable to provide sufficient ink performance either for glossy paper or for plain paper. There is also a method of employing a glossy paper having its glossiness controlled for making loss of glossiness difficult to recognize in a case where a pigment type ink is used. This method, however, has lower image quality compared to a case of employing a combination of dye type ink and glossy paper.

Meanwhile, the method of using a dye type ink as a color ink and a pigment type ink as a black ink is employed considering that most text images are recorded on plain paper with black ink. The use of a pigment type ink suited for recording on plain paper as a black ink improves the image quality of the text image (plain paper image).

Furthermore, since a black color (composite black) can be reproduced by combining cyan (C), magenta (M), and yellow (Y), a composite black ink, being a combination of inks of the three colors, can be used as black ink for recording on glossy paper. Therefore, a satisfactory fixablity on a recording paper can be attained without loss of glossiness.

The method of employing composite black ink for reproducing black, however, has a problem in adjusting gray balance (for the sake of convenience, black represented in gradation levels is referred to as gray). Since colors are reproduced by subtractive color mixing, black is, theoretically, reproducible by combining C, M, and Y. However, since the inks for each color do not necessarily have ideal C, M, Y color characteristics, the inks are subject to a process of, for example, a γ correction process or a halftone process in order to reproduce the ideal C, M, Y color characteristics.

More particularly, in the halftone process, various modifications are made for improving not only toning but also granularity and texture. For example, in a case of inkjet recording apparatuses, a so-called error diffusion method is widely employed in which the spatial frequency characteristic of dot arrangements is of a high frequency. Furthermore, a dither method (as shown in Japanese Laid-Open Patent Application No.11-150652) serves to improve visual granularity by providing a blue noise characteristic to the halftoned dot arrangement for each color.

Regarding each gradation level of the resultant black composite, these methods have extreme difficulty in coordinating the resultant black composites to an ideal gray(s). As shown in FIG. 20, these methods result to variably distributed hues. In the example shown in FIG. 20, the tinting of gray in each gradation level changes from a cyan-like gray to a blue-like gray, and then to a magenta-like gray.

Such disarrangement in gray balance leads to a considerable reduction of image quality. Although a method expressing gradation with continuous tone change is not used for expressing typical photograph images, it is often used for expressing artificial gradation images including three dimensional CAD images, computer graphic images, and presentation images. In outputting the latter images, a variable gray balance and changing hue leads to unevenness of color and results in reduction of image quality.

Reduction of image quality due to unevenness of color becomes more apparent in a case of using composite black as an alternative for reproducing black on glossy paper, for example, since monochrome images and black characters (black letters) are processed with use of composite black.

SUMMARY OF THE INVENTION

In an aspect of this disclosure, an image forming apparatus is provided for reproducing a black color by using an ink other than a black ink when recording an image on a recording medium, the image forming apparatus including: an image processing part for disposing dots of multiple colors in various gradation levels, the image processing part being configured to dispose the dots of each color in a predetermined gradation level at a same position.

In the image forming apparatus according to an embodiment of the present invention, the image processing part may be configured to adjust the position of the dots in accordance with target input image data. In the image forming apparatus according to an embodiment of the present invention, the target input image data may include a graphic image, a photograph image, and a character/linear image, wherein the image processing part shifts the predetermined gradation level toward high density, wherein the density of the predetermined gradation level becomes higher in an order of graphic image≦photograph image≦character/linear image.

In the image forming apparatus according to an embodiment of the present invention, the image processing part may be configured to dispose the dots of each color in a predetermined gradation level at a same position in response to a request from the outside.

In the image forming apparatus according to an embodiment of the present invention, the image processing part may be configured to dispose the dots of each color in a predetermined gradation level at a same position in accordance with at least one of type of recording medium or a recording method.

In the image forming apparatus according to an embodiment of the present invention, the image processing part may be configured to dispose the dots of each color in a predetermined gradation level at a same position in a case where the ink has an insufficient fixing property with respect to the recording medium.

In the image forming apparatus according to an embodiment of the present invention, the image processing part may be configured to dispose the dots of each color in a predetermined gradation level at a same position in a case where the ink is a pigment type ink and the recording medium is at least one of a glossy paper or an OHP paper.

In another aspect of this disclosure, an image processing method is provided for reproducing a black color by using an ink other than a black ink when recording an image on a recording medium, the image processing method including: an image processing step for disposing dots of multiple colors in various gradation levels, the image processing step including a step of disposing the dots of each color in a predetermined gradation level at a same position.

In the image processing method according to an embodiment of the present invention, the image processing step may include a step of adjusting the position of the dots in accordance with target input image data.

In the image processing method according to an embodiment of the present invention, the target input image data may include a graphic image, a photograph image, and a character/linear image, wherein the image processing step shifts the predetermined gradation level toward high density, wherein the density of the predetermined gradation level becomes higher in an order of graphic image≦photograph image≦character/linear image.

In the image processing method according to an embodiment of the present invention, the image processing step may include a step of disposing the dots of each color in a predetermined gradation level at a same position in response to a request from the outside.

In the image processing method according to an embodiment of the present invention, the image processing step may include a step of disposing the dots of each color in a predetermined gradation level at a same position in accordance with at least one of type of recording medium or a recording method.

In the image processing method according to an embodiment of the present invention, the image processing step may include a step of disposing the dots of each color in a predetermined gradation level at a same position in a case where the ink has an insufficient fixing property with respect to the recording medium.

In the image processing method according to an embodiment of the present invention, the image processing step may include a step of disposing the dots of each color in a predetermined gradation level at a same position in a case where the ink is a pigment type ink and the recording medium is at least one of a glossy paper or an OHP paper.

In another aspect of this disclosure, a printer driver is provided for outputting image data to an image forming apparatus for reproducing a black color by using an ink other than a black ink when recording an image on a recording medium, the printer driver including: an image processing part for disposing dots of multiple colors in various gradation levels, the image processing part being configured to dispose the dots of each color in a predetermined gradation level at a same position.

Other aspects and further features of the present invention will be apparent from the following detailed description when read in conjunction with the accompanying drawings.

BRIEF DESCRIPTION OF THE DRAWINGS

FIG. 4 is a drawing for explaining an example of a conveyor belt of an image forming apparatus according to an embodiment of the present invention;

FIGS. 5A-5B are drawings for explaining a recording operation of an image forming apparatus according to an embodiment of the present invention;

FIG. 7 is a block diagram for explaining an exemplary configuration of a printer driver of a data processing (image processing) apparatus according to an embodiment of the present invention from a functional aspect;

FIG. 8 is a block diagram for explaining another exemplary configuration of a printer driver of a data processing (image processing) apparatus according to an embodiment of the present invention from a functional aspect;

FIG. 9 is a diagram for explaining a halftone process using a dither method;

FIG. 10 is a diagram for explaining a halftone process using an error diffusion method;

FIG. 11 is a diagram for explaining formation of composite black;

FIG. 15 is a diagram for explaining the dot size of the 3K dot in a case where droplets of C, M, Y are deviated from a target contact position;

DESCRIPTION OF THE PREFERRED EMBODIMENTS

In the following, embodiments of the present invention are described with reference to the accompanying drawings.

Figure 1:
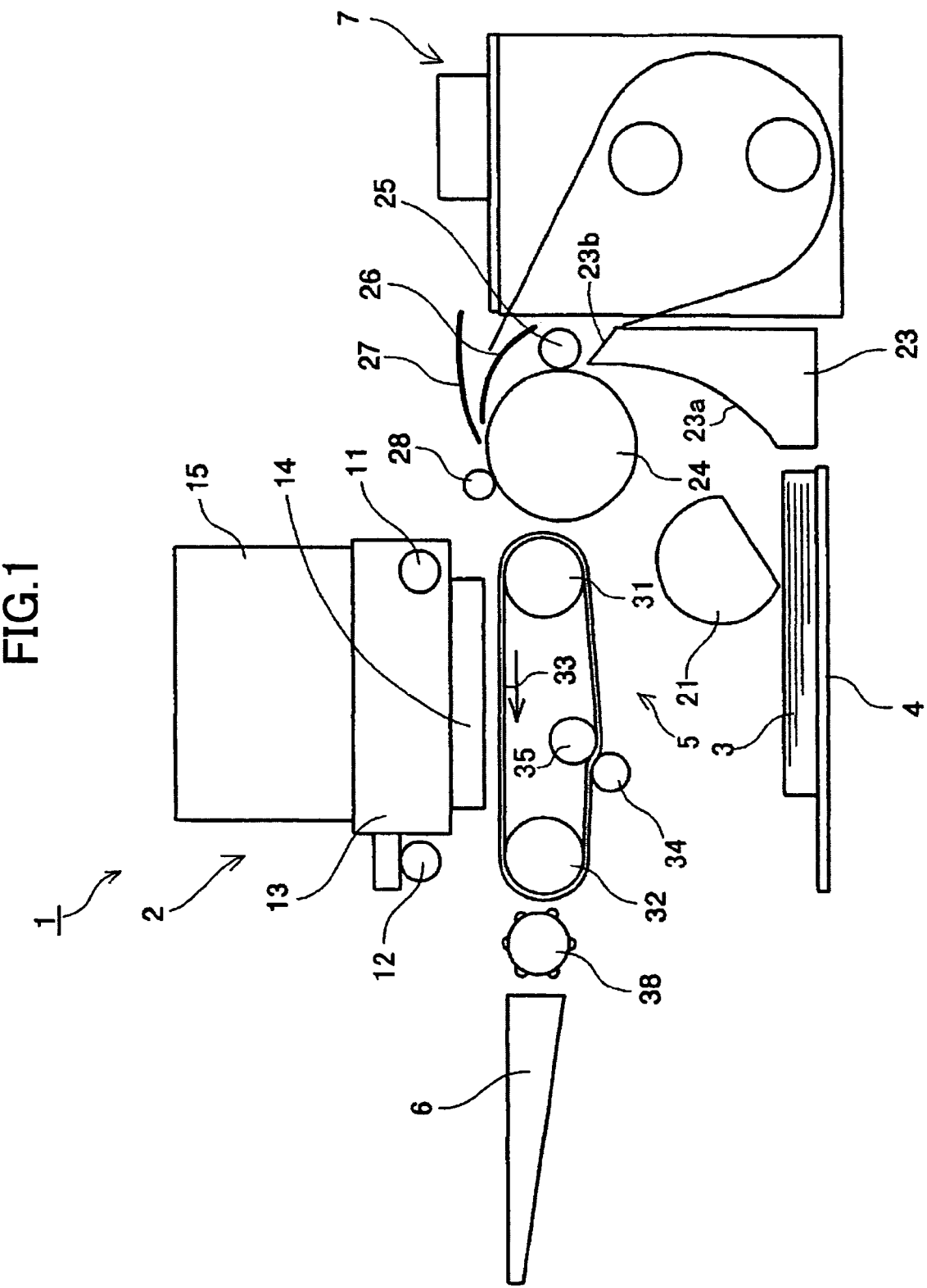
FIG. 1 is a schematic diagram showing a mechanism part of an inkjet recording apparatus serving as an example of an image forming apparatus according to an embodiment of the present invention.
Figure 2:
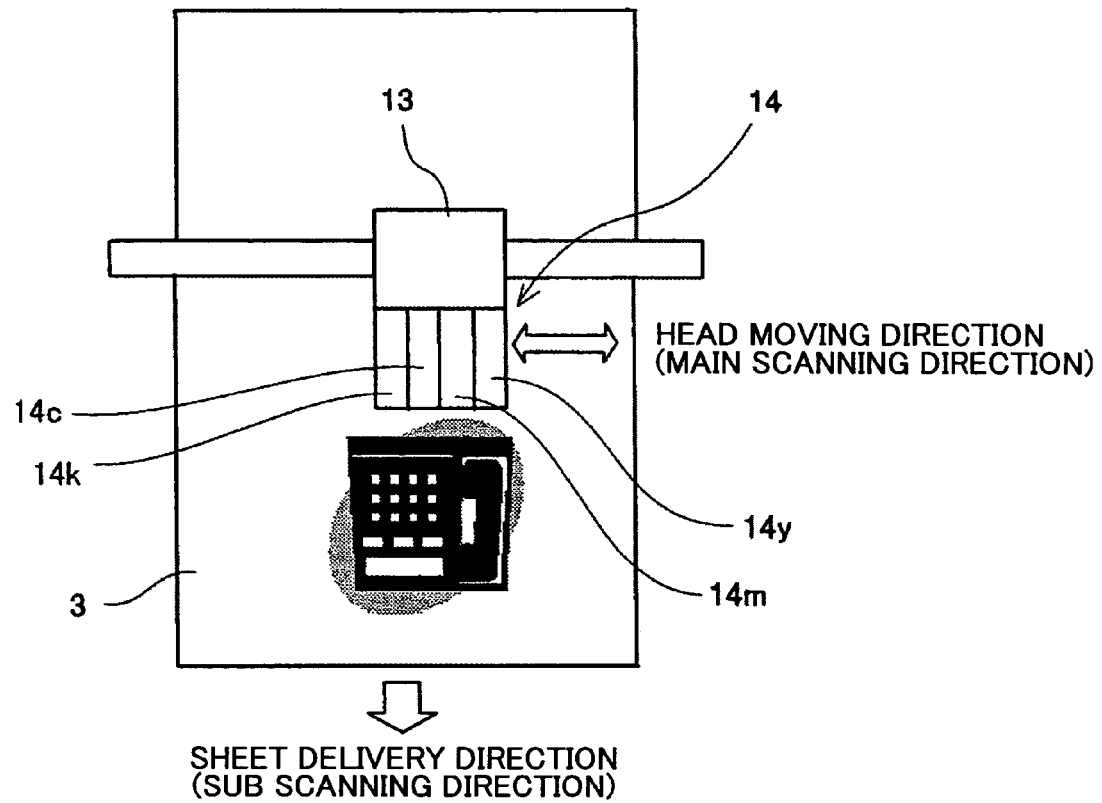
FIG. 2 is a plan view for explaining a part of a mechanism part of an inkjet recording apparatus serving as an example of an image forming apparatus according to an embodiment of the present invention.
Figure 3:
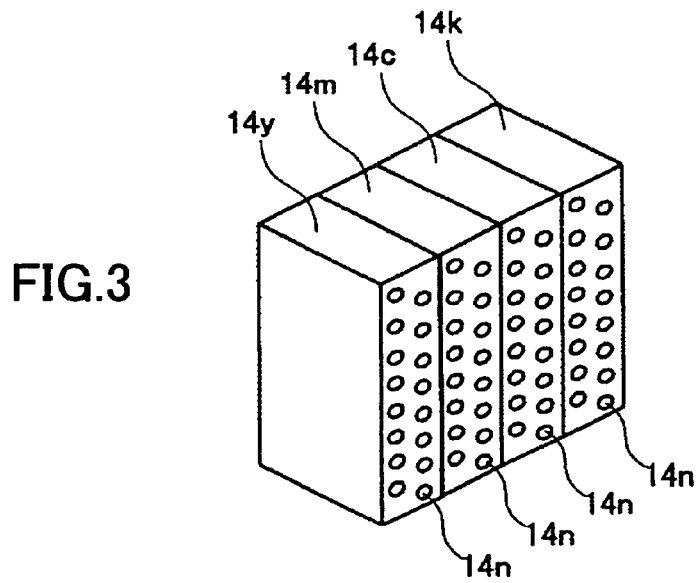
FIG. 3 is a perspective view for explaining a configuration of a head unit of an image forming apparatus according to an embodiment of the present invention.

First, with reference to FIGS. 1-4, an inkjet recording apparatus capable of recording in both directions (both sides) is described as an example of an image forming apparatus of the present invention. It is to be noted that FIG. 1 is a schematic diagram showing an overall mechanism part of an inkjet recording apparatus according to an embodiment of the present invention, FIG. 2 is a plan view for explaining a part of the inkjet recording apparatus according to an embodiment of the present invention, FIG. 3 is a perspective view for explaining a configuration of a head unit of the inkjet recording apparatus according to an embodiment of the present invention, and FIG. 4 is a schematic cross-sectional view for explaining a conveyor belt of the inkjet recording apparatus according to an embodiment of the present invention.

An inkjet recording apparatus 1, which includes components such as an image forming part 2, a paper feed tray 4 for mounting a large amount of recording media 3 (hereinafter referred to as "paper(s)") 3, a conveying mechanism 5, and a discharge tray 6. In the inkjet recording apparatus 1, the paper 3 is fed from the paper feed tray 4, is then conveyed by the conveying mechanism 5, is then recorded with a prescribed image by the image forming part 2, and is then discharged to the discharge tray 6.

The inkjet recording apparatus 1 also includes a double-side printing unit 7 that is detachably attached to a main body of the inkjet recording apparatus 1. In a double-side printing operation, the paper 3, after having one side (front side) printed, is conveyed in a reverse direction to the double side recording unit 7 by the conveying mechanism 5, is flipped upside down for making the other side (back side) the target printing side, is delivered again to the conveying mechanism 5, has the other side (back side) recorded with another prescribed image, and is discharged to the discharge tray 6.

The image forming part 2 includes a carriage 13 being slidably held by guide shafts 11, 12. A main scan motor (not shown) moves the carriage 13 in a direction (main scanning direction) that perpendicularly intersects with the paper delivery direction for delivering the paper 3. The carriage 13 includes a recording head 14 having an arrangement of multiple nozzles 14n from which liquid droplets (ink droplets) are jetted. Furthermore, an ink cartridge 15 is detachably attached to the recording head 14 for supplying liquid (ink) thereto. It is to be noted that a sub tank may be attached as an alternative to the ink cartridge 15 for supplying ink from a sub tank to a main tank.

As shown in FIGS. 2-3, the recording head 14 is provided with separate inkjet heads 14y, 14m, 14c, and 14k for jetting liquid (ink) droplets of yellow (Y), magenta (M), cyan (C), and black (K), respectively. Alternatively, the recording head 14 may be provided with one or more inkjet heads having multiple rows of nozzles corresponding to each color. It is to be noted that the number of colors and/or the order (alignment) of the colors are not to be limited to the above-described example.

The recording head 14 may be provided with an energy generating part for jetting the ink droplets. The energy generating part may be, for example, a piezoelectric actuator (e.g. piezoelectric element), a thermal actuator that uses phase change of a boiling liquid film by employing an electro-thermal converting element (e.g. heating resistance element), a shape memory alloy actuator that uses phase change of a metal changed by heat transfer, or an electrostatic actuator that uses electrostatic force.

The paper(s) 3, being mounted on the paper feed tray 4, are separated by a paper feed roller (meniscus roller) 21 and a paper separating pad (not shown) and is fed in a sheet by sheet manner to the conveying mechanism 5.

The conveying mechanism 5 includes a conveyance guiding part 23 for guiding the paper 3 from the paper feed tray 4 upward along a guide face 23a and guiding the paper 3 from the double side printing unit 7 along a guide face 23b, a conveying roller 24 for conveying the paper 3, a pressure roller 25 for pressing the paper 3 against the conveyance roller 24, and a guide member 26 for guiding the paper 3 to the conveyance roller 24, a guide member 27 for guiding the paper 3 to the double-side printing unit 7, and a pressing roller 28 for pressing the paper 3 conveyed from the conveyance roller 24.

Furthermore, the conveying mechanism 5 includes, for example, a conveyor belt 33 stretched between a drive roller 31 and a driven roller (tension roller) 32 for maintaining a flat state at a position corresponding to recording head 14, a charging roller 34 for charging the conveyor belt 33, a guide roller 35 situated opposite to the charging roller 34, a guide member (platen plate, not shown) for guiding the conveyor belt 33 to a section situated opposite to the image forming part 2, and a cleaning roller (cleaning part, not shown) including a porous part for removing recording liquid (ink) adhering to the conveyor belt 33.

The conveyor belt 33 according to the embodiment of the present invention is an endless belt, being stretched between the drive roller 31 and the driven roller 32, is configured to rotate in an arrow direction (paper conveying direction) shown in FIG. 1.

The conveyor belt 33 may be a single layer configuration or a multilayer configuration having a first layer (front layer) 33a and a second layer (back layer) 33b as shown in FIG. 4. For example, the front layer 33a may be formed with a pure resin material to which no rheostatic control is applied (e.g. ETFE pure material having a thickness of approximately 40 µm) and the back layer 33b (earth layer, medium resistance layer) of the conveyor belt 33 may be formed with a resin material similar to the front layer 33a to which a rheostatic control using carbon is applied.

The charge roller 34 is disposed to abut the front layer 33a of the conveyor belt 33 and thus rotate in correspondence with the rotation of the conveyor belt 33. The charge roller 34 is supplied with high voltage from a high voltage circuit (high voltage power source, not shown) in a predetermined pattern.

Furthermore, a discharge roller 38 is situated at a downstream side of the conveying mechanism 5 for discharging the paper 3 (on which an image recorded) to the discharge tray 6.

In the inkjet recording apparatus (image forming apparatus) 1 according to the embodiment of the present invention, the conveyor roller 33 rotates in the arrow direction and is positively charged by the abutting high voltage charge roller 34. The conveyor belt 33 is charged at predetermined intervals by switching the polarity of the charge roller 34 at predetermined intervals of time.

When the paper 3 is fed onto the conveyor belt 33 (being charged to high potential), the inside of the paper 3 reaches a polarized state, in which the charge having a polarity opposite of the charge on the conveyor belt 33 is induced to a face of the paper 3 contacting the conveyor belt 33 and the charge on the conveyor belt 33 and the charged induced on the paper 3 electrostatically attract each other, to thereby allow the conveyor belt 33 to electrostatically attach the paper 3 thereon. Accordingly, by having the paper 3 firmly attached to the conveyor belt 33, warping and unevenness of the paper surface can be eliminated and the paper 3 can be disposed in a sufficiently flat state.

In a recording operation, the paper 3 is moved by rotating the conveyor belt 33 and the carriage 13 is moved (scanned) in one direction or in both directions while driving the recording head 14 in accordance with image signals. More specifically, as shown in FIGS. 5A and 5B, liquid droplets (ink droplets) 14i are jetted (ejected) from the recording head 14 to the paper 3 and form dot(s) Di by striking the surface of the paper 3. After a single row is recorded on the paper 3, the conveyor belt 33 moves the paper 3 for a predetermined distance for recording the next row. When a signal indicating completion of the recording process or a signal indicating detection of a rear end of the paper 3 is transmitted, the recording operation is ended. It is to be noted that FIG. 5B is an enlarged view showing the Dot Di shown in FIG. 5A.

Finally, the paper 3 is discharged to the discharge tray 6 by the discharge roller 38.

Figure 6:
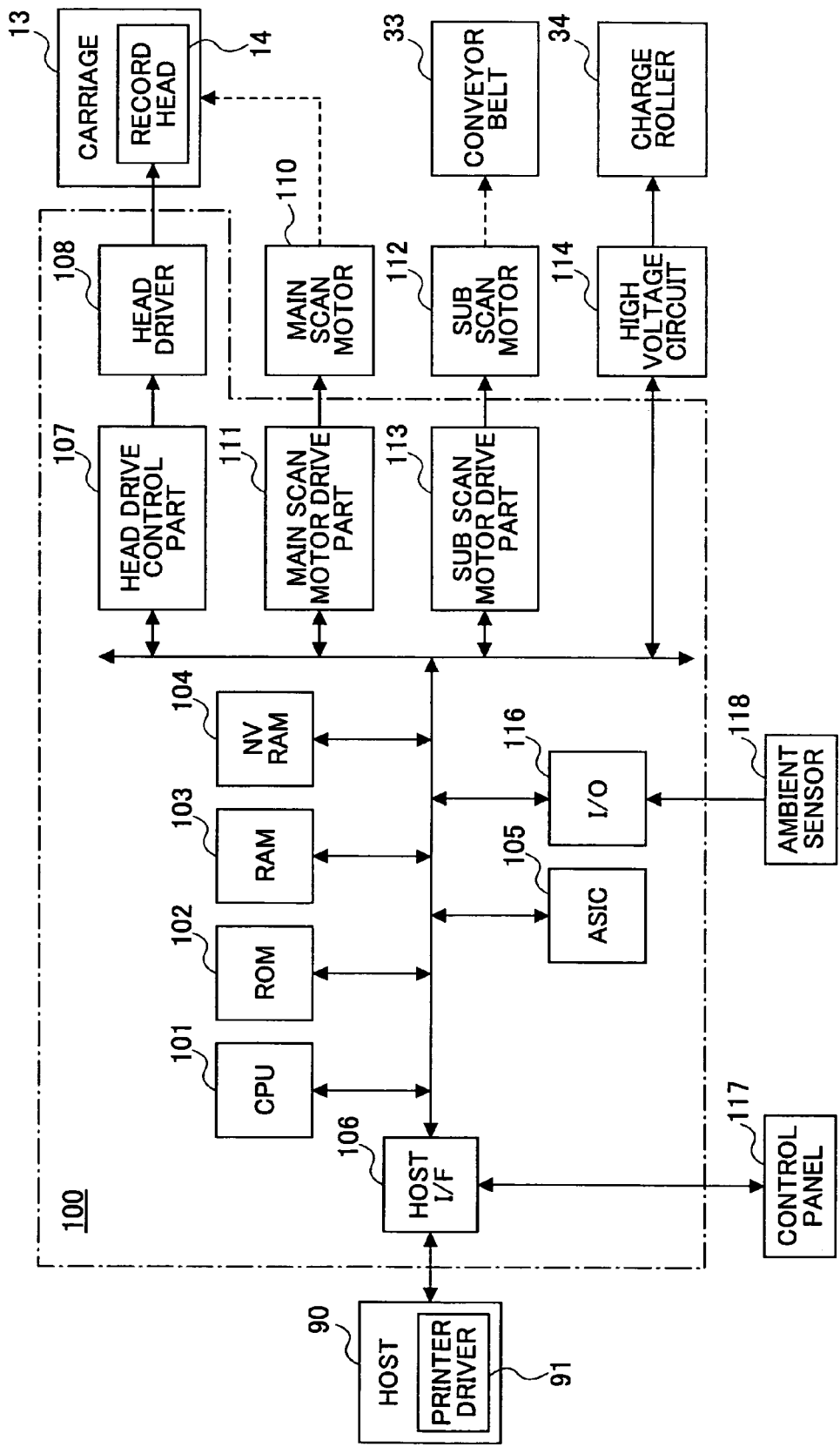
FIG. 6 is a schematic block diagram showing a control part of an image forming apparatus according to an embodiment of the present invention.

Next, a control part 100 of the inkjet recording apparatus (image forming apparatus) 1 is described with reference to FIG. 6. FIG. 6 is a block diagram showing an overall configuration of the control part 100.

The control part 100 includes a CPU 101 for executing overall control of the image forming apparatus 1, a ROM 102 for storing programs executed by the CPU 101 and other fixed data, a RAM 103 for temporarily holding image data, etc., a non-volatile memory (NVRAM) 104 for maintaining data even during a power-off state of the image forming apparatus 1, and an ASIC 105 for processing various signals including input/output signals for performing image processing and other various controls of the image forming apparatus 1.

Furthermore, the control part 100 also includes a host I/F 106 for transmitting/receiving data and signals with respect to a host 90 serving as a data processing apparatus (e.g. personal computer) for installing, for example, a printer driver 91 of the present invention, a head drive control part 107 and a head driver 108 for controlling and driving the recording head 14, a main scan motor drive part 111 for driving a main scan motor 110, a sub scan motor drive part 113 for driving a sub scan motor 112, a sub-system drive part 294 (not shown) for driving a motor of a sub-system 71, an ambient sensor 118 for detecting ambient temperature and/or ambient humidity, and an I/O 116 for inputting detection signals received from various sensors.

The control part 110 is connected to a control panel 117 for inputting and displaying information to the image forming apparatus 1. Furthermore, the control part 100 also controls the switching of the output polarity and the on/off for the high voltage circuit (high voltage power source) that applies high voltage to the charge roller 34.

In the control part 100, the I/F 106 receives, for example, print data such as image data from the host 90 including data from the data processing apparatus (e.g. personal computer), an image reading apparatus (e.g. scanner), and an imaging apparatus (e.g. digital camera) via a cable or a network (e.g., Internet). The print data of the control part 100 are output by the printer driver 91 of the host 90.

The CPU 101 reads and analyzes the print data inside a reception buffer in the I/F 106. Then, a predetermined process (e.g. arranging the order of the data) is performed on the data in the ASIC 105. Then, the data including image data are transferred to the head drive control part 107. It is to be noted that the printer driver 91 of the host 90 converts image data to bit map data and then transfers the data to the image forming apparatus 1 according to this embodiment of the present invention. However, this process may be executed, for example, by storing font data in the ROM 102.

When the head drive control part 107 receives image data (dot pattern data) amounting to data for recording a single row with the recording head 14, the dot pattern data are transmitted as serial data to the head driver 108 in synch with clock signals. In addition, latch signals are transmitted to the head driver 108 at a predetermined timing.

The head drive control part 107 includes a ROM (not shown, ROM 102 may be employed) storing pattern data of drive waveforms (drive signals), a waveform generation circuit (not shown) including a D/A converter for performing D/A conversion of drive waveform data read out from the ROM, and a drive waveform generation circuit (not shown) including, for example, an amplifier.

The head driver 108 includes, for example, a shift register (not shown) for inputting serial data including clock signals and image data from the head drive control part 107, a latch circuit (not shown) for latching the register value of the shift register with the latch signals received from the head drive control part 107, a level conversion circuit (not shown, level shifter) for converting the level of the output value of the latch circuit, and an analog switch array (switch part) for controlling the switching on/off of the level shifter. Accordingly, by controlling the switching on/off of the analog switch array, the head driver 108 selectively applies a predetermined drive waveform to the actuator part of the recording head 14, to thereby drive the recording head 14.

Next, an exemplary configuration of a data processing apparatus including the printer driver 91 for transmitting image data to the image forming apparatus 1 is described with reference to FIGS. 7-8.

In the example shown in FIG. 7, the printer driver 91 of the data processing apparatus includes a CMM (Color Management Module) part 131 for performing conversion of image data 130 (e.g. image data from application software) from a monitor display color space to a recording apparatus color space (i.e. from RGB calorimetric system to CMY colorimetric system), a BG/UCR (Black Generation/Under Color Removal) process part 132 for performing black generation/under color removal with the value of CMY, a γ correction part 133 for performing input/output correction in accordance with characteristics of the recording apparatus and/or preferences of the user, a zooming part 134 for performing an enlarging (zooming) process in accordance with a resolution of the recording apparatus 1, and a halftone process part 135 including a large value/small value matrix for converting the image data to a dot pattern arrangement to be jetted from the recording apparatus 1.

In the example shown in FIG. 8, the printer driver 91 of the data processing apparatus includes a CMM (Color Management Module) part 131 for performing conversion of image data 130 (e.g. image data from application software) from a monitor display color space to a recording apparatus color space (i.e. from RGB calorimetric system to CMY colorimetric system), a BG/UCR (Black Generation/Under Color Removal) process part 132 for performing black generation/under color removal with the value of CMY, and a γ correction part 133 for performing input/output correction in accordance with characteristics of the recording apparatus and/or preferences of the user.

In the example shown in FIG. 8, the control part 100 of the recording apparatus (image forming apparatus) 1 receives γ corrected data. Thus, the control part 100 is after the γ correction output is provided with a zooming part 134 for performing an enlarging (zooming) process in accordance with a resolution of the recording apparatus 1, and a halftone process part 135 including a large value/small value matrix for converting the image data to a dot pattern arrangement to be jetted from the recording apparatus 1.

As described with FIGS. 7 and 8, since image data are processed with the computer in a form of RGB calorimetric system data for being displayed on a monitor, the image data are to be converted to CMY(K) colorimetric system data. Accordingly, the CMM process part 131 converts RGB color space data to CMY color space data. Then, the BG/UCR process part 132 generates black data "K" from the CMY data.

Furthermore, the γ correction performed by the γ correction part 133 enables small adjustment of CMYK data and adjustment of data levels in accordance with characteristics of the recording apparatus (e.g. printer) and/or settings of the user. Since the amount of information included in a single pixel of a printer is less than that of a single pixel of a monitor, the printer is to compensate for such lack of information with dot density in a case of expressing gradation with the printer.

Accordingly, the printer further fragments the data for a single pixel of a monitor and increases resolution.

The halftone process part (large value, small value matrix) 135 performs a threshold matrix process (halftone process) in which large value data (m) generated for display on a monitor are converted to large value data (n1) or small value data (n2) enabling output with a printer (m>n1≧n2≧2). The large value, small value matrix used in the halftone process part 135 is applied with a dither process using a threshold matrix (as shown in FIG. 9, for example) or an error diffusion process (as shown in FIG. 10, for example), and the original large value data are converted by on/off dots.

In the dither process shown in FIG. 9, an input large value image data (as shown in FIG. 9(a)) are compared with a threshold matrix (dither matrix) formed with a predetermined method (as shown in FIG. 9(b)), and then only the pixels which are greater than (or less than) the corresponding value in the threshold matrix are converted into dots (as shown in FIG. 9(c)). It is to be noted that, although FIG. 9 illustrates binary values indicated with on/off dots, other methods may also be employed. For example, a small dot, a medium dot, and a large dot may be employed for reproducing the gradation, in which a threshold matrix corresponding to the sizes of the dots is compared with the input image data, and corresponding pixels are converted to dots.

The error diffusion process shown in FIG. 10 is more complicated than the dither process. FIG. 10 shows an exemplary a binary error diffusion operation. In this operation, each pixel is subject to a threshold process. Then, the obtained error for each pixel is maintained for use in a subsequent calculating process using a predetermined ratio. In the error diffusion process, information which would be truncated in a dither process can be fed back to an output image, to thereby provide image quality higher than a dither image from the aspects of, for example, resolution.

Next, in the image processing method, the image forming apparatus, and the printer driver according to an embodiment of the present invention, a method of reproducing composite black is described. With this method of reproducing composite black, black is reproduced by using colors other than black or by mixing black ink and a color ink other than black ink.

The inkjet recording apparatus 1 reproduces colors by using 4 colors including cyan (C), magenta (M), yellow (Y), and black (K). Furthermore, the inkjet recording apparatus 1 may reproduce colors by using 6-7 colors including low density ink (so-called photoink, photocyan (PC), and photomagenta (PM) for obtaining high quality images.

Although black ink is basically used for reproducing black, black can be artificially obtained by combining cyan dots, magenta dots, and yellow dots (also referred to as "CMY dots". This owes to the characteristics of subtractive color mixing, in which lightness and chroma decrease as colors are overlapped. It is to be noted that the black color reproduced by combining the CMY dots is referred to as "composite black". The black color reproduced by using black ink is referred to as "real black". In the drawings, in order to differentiate between composite black and real black, composite black is illustrated in a shadowed manner and real black is illustrated in a filled-in manner.

As described above, in a case of employing an inkjet recording apparatus using pigment type ink for black ink and dye type ink for cyan ink (C), magenta ink (M), and yellow ink (Y), black is recorded on glossy paper by using composite black by combining dye type inks of C, M, and Y and not using black ink, so as to prevent loss of glossiness and insufficient fixation property.

In a case where the input data are 100% black or the proportion of black is near 100%, CMY dots are overlapped with a relatively same proportion. Therefore, change of hue is hardly recognizable and a black color that is close to an ideal black color is reproduced.

Meanwhile, in a case where black covers a small proportion of the input data (e.g. 10% black, 30% black), that is, in a case where white areas cover a large proportion of the input data, composite black dots (hereinafter referred to as "3K dot(s)") may vary depending on how the CMY dots are overlapped (e.g. blue-like black dots or red-like black dots). Such varying black dots may adversely affect image quality. Furthermore, in a case where the CMY combination dots are allocated among single color C, M, Y dots, the granularity of the image may deteriorate.

Figure 12:
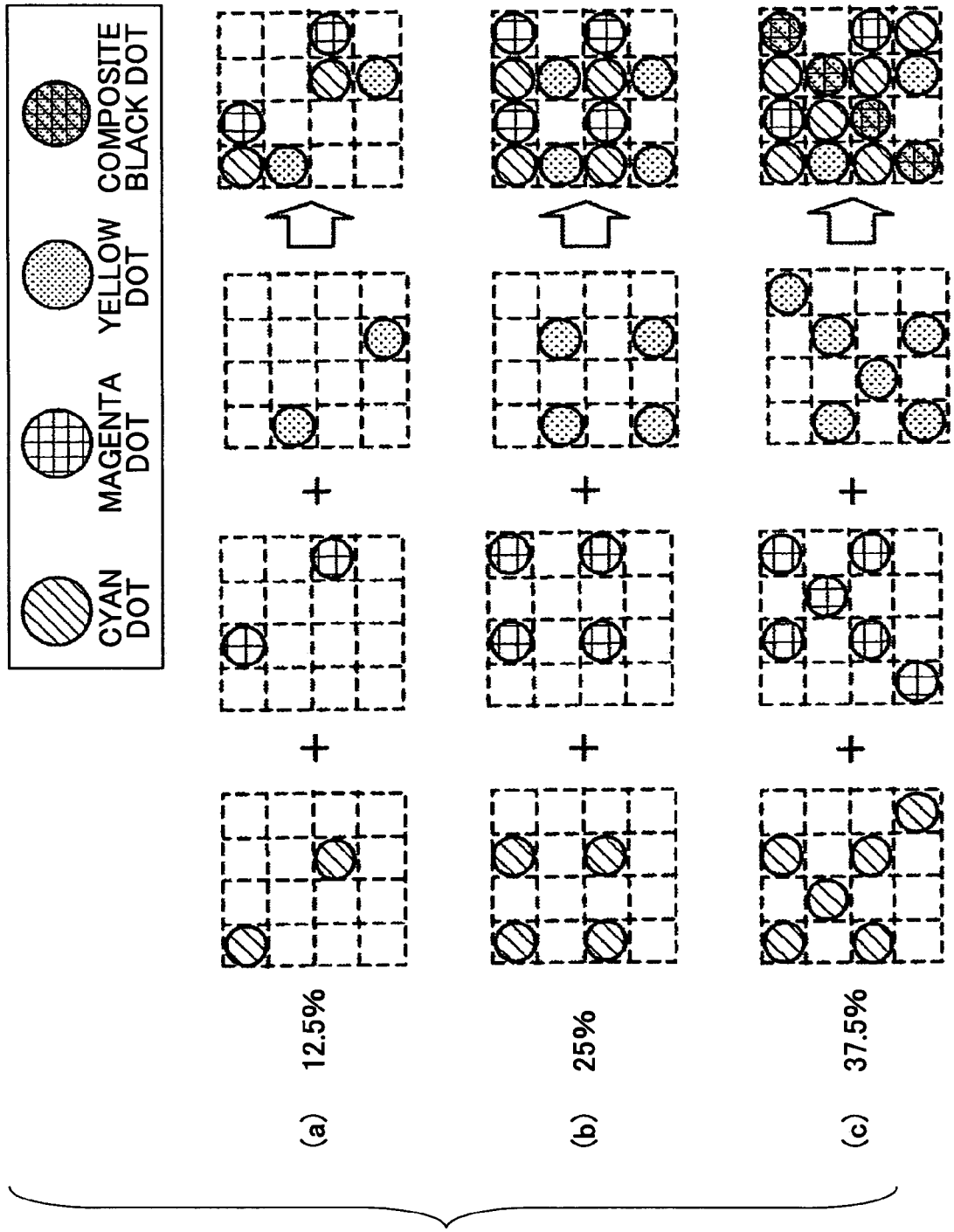
FIG. 12 is a diagram for explaining a case where a bayer type dither mask is employed so that dots of each color are disposed at different threshold application positions.

Accordingly, as shown in FIG. 12, in order to prevent undesired creation of 3K dots, the arrangement pattern of the dots is adjusted in a halftone process for C, M, Y, respectively. It is to be noted that by altering the coordinates of each dot for each color in a dot generation pattern (Bayer type), overlapping of dots in a low gradation level can be reduced. There is also a method of applying different dot generation patterns that rotates dot generation patterns.

Furthermore, in a case employing the error diffusion process, since the arrangement pattern of dots may be completely different for each pixel, the generation of 3K dots is prevented by, for example, executing a random number noise superposing process.

Furthermore, even when input data are "R=G=B", by employing CMM or γ correction, the actual number of dots for a single unit of area may be different. Accordingly, this imbalance of dots may lead to change of gray balance.

Accordingly, with the image forming apparatus, the image processing method, and the printer driver according to the embodiment of the present invention, in a printing mode for reproducing black by using composite black, the dots of each color are formed in the same position in a halftone process when the data for black, that is, input image data are "R=G=B". That is, in a case of reproducing black by using an ink other than black ink, the dots of each color are disposed at a same position.

Figure 13:
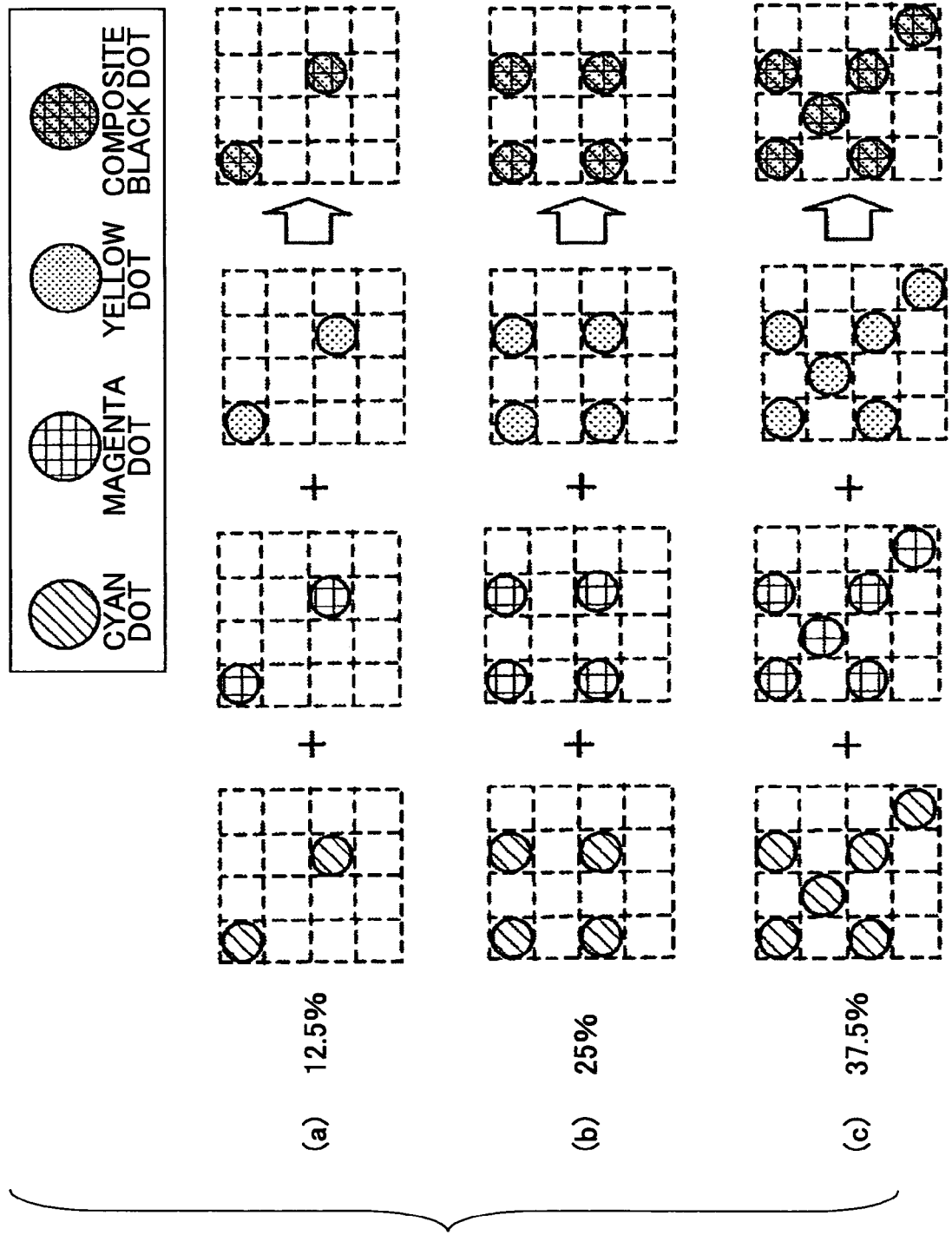
FIG. 13 is a diagram for explaining a case where a bayer type dither mask is employed so that dots of each color are disposed at the same threshold application positions.

The embodiment of the present invention is described with reference to FIG. 13. Since black is reproduced only by overlapped CMY dots (3K dots), the composite black dots have a constant fixed hue, in which gray balance does not differ in each gradation level. Since input data are subject to CMM and/or γ correction, it is possible primary color dots of C,M,Y or secondary colors of RGB may be mixed among the dots instead of being formed into composite black dots. However, since the input data are originally "R=G=B" data, such a possibility is extremely unlikely and hardly affects the hue. It is to be noted that FIG. 13(a) shows an example where the black proportion is 12.5%, FIG. 13(b) shows an example where the black proportion is 25%, and FIG. 13 (c) shows an example where the black proportion is 37.5%.

Accordingly, in a case of reproducing black by using a color ink(s) other than black ink (or a case of reproducing black by mixing black ink with a color ink other than black ink), a composite black with a satisfactory gray balance can be obtained by disposing a dot(s) of each color in a given gradation level at a same position even in a recording mode that does not use black ink. That is, unevenness of color caused by deviation in the distribution of each dot in each gradation level can be prevented and black can be reproduced in a uniform color tone.

Figure 14:
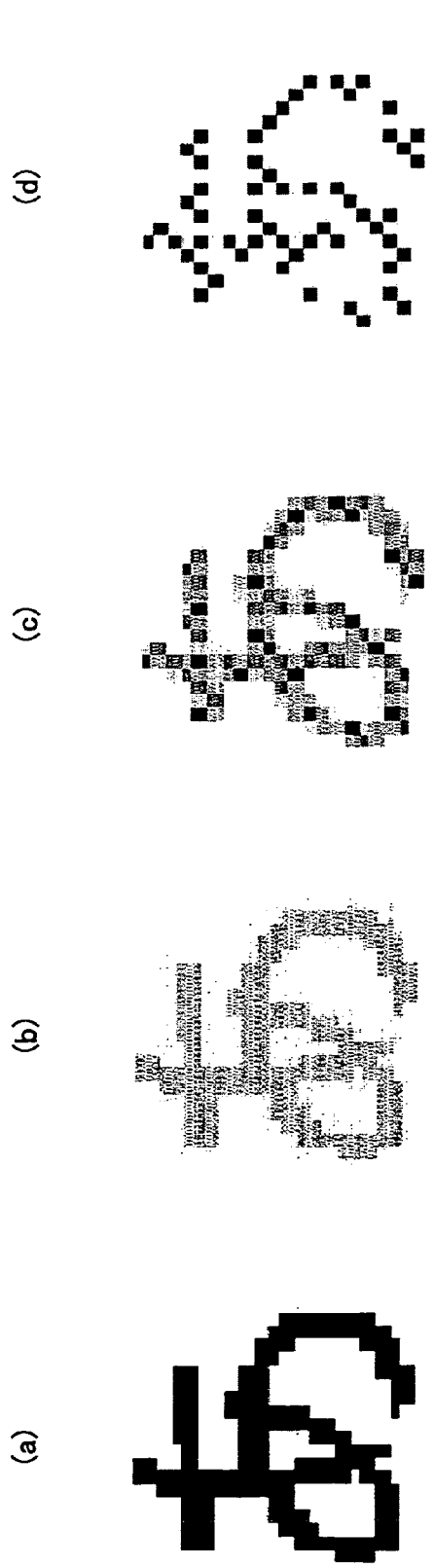
FIG. 14 is a diagram for explaining the effects of moving the positions of dots in a case of reproducing a character of low density by using composite black.

However, in some cases, it is found that merely disposing the dots of each color at the same position may lead to reduction of image quality. One example of such case is a case of recording a character image as shown in FIG. 14. In a case where the black proportion is 100% (as shown in FIG. 14(a)), the shape of the character is accurately reproduced since 3K dots are evenly disposed as described in FIG. 11. In a case where the black proportion is 40% (as shown in FIG. 14 (b)), the character becomes severely disfigured when the dots of each color (C, M, Y) are disposed at the same positions (as shown in FIG. 14(d)) due to blank areas at which no dots are disposed. In this case, the character is formed with a more suitable appearance when the dots of each color are displaced in different-positions (as shown in FIG. 14(c)) by applying a halftone process.

The results in recording photograph images are similar (although not as apparent) to the above-described results in recording character images. In recording with a highlighted gradation similar to a white background, black dots and 3K dots stand out considerably, and granularity tends to be unsatisfactory. Particularly, in a case of recording with 3K dots, the slight deviation in the droplet contact areas of each dot of each color may cause dot size to seem large (as shown in FIG. 15) and further adversely affect granularity. Accordingly, in recording photograph images, it is preferable not to dispose the dots in a same position when recording in a gradation level that is considerably close to a white background.

On the other hand, in recording image data of so-called graphic images (graphics), the feature of the present invention using 3K dots can be effectively applied since the images largely use artificial gradation patterns (granularity is not as significant compared to that of photograph images) and single gradation level solids (unevenness of color is apparent).

Since the effect in applying the present invention is different depending on the type of image, it is preferable to control recording of images as described below.

(1) Switch between "do not dispose CMY dots at same positions" (process shown in FIG. 16) and "dispose CMY dots at same positions" (process shown in FIGS. 17-18) in accordance with the gradation level of the input black color.

(2) Adjust gradation level as shown below in accordance with input image data object (type of image), wherein gradation level 0 is a white background.

gradation level=graphic≦photograph≦character/line

Since the desired property (color reproducibility, granularity, sharpness) differs depending on the object (character/line, photograph, graphics), adjustments are made as to whether dots in a gradation level are to be disposed at the same position in accordance with the input image data object (character/line, photograph, graphics). Accordingly, deterioration of such properties can be prevented.

Furthermore, as described above, although unevenness of black can be prevented by disposing the dots of each color at same positions, granularity deteriorates due to excessive attachment of dots (increase of density) and deviation of position (increase of dot diameter). Therefore, particularly in a case of recording photograph images, such deterioration of granularity largely reduces image quality. Hence, applying the present invention in recording a highlight part of a photograph image is unsuitable.

Furthermore, in recording character/line images, halftone processing will cause missing dots to thereby lead to reduction of image quality. In this case, the missing dots cannot be compensated for if the dots of each color are disposed at same positions. Therefore, in this case, it is preferable to not dispose the dots of each color at same positions so that the missing dots can be less noticeable. Furthermore, since the recording area is small, the recording of character/line images demonstrates a characteristic in that unevenness of color is hardly recognizable.

On the other hand, in recording image data of graphic images, the feature of the present invention using 3K dots can be effectively applied since the images largely use artificial gradation patterns (granularity is not as significant compared to that of photograph images) and single gradation level solid (unevenness of color is apparent).

Therefore, by adjusting the gradation level in accordance with the object (type of image), the present invention can be applied regardless of the type of image.

Figure 16:
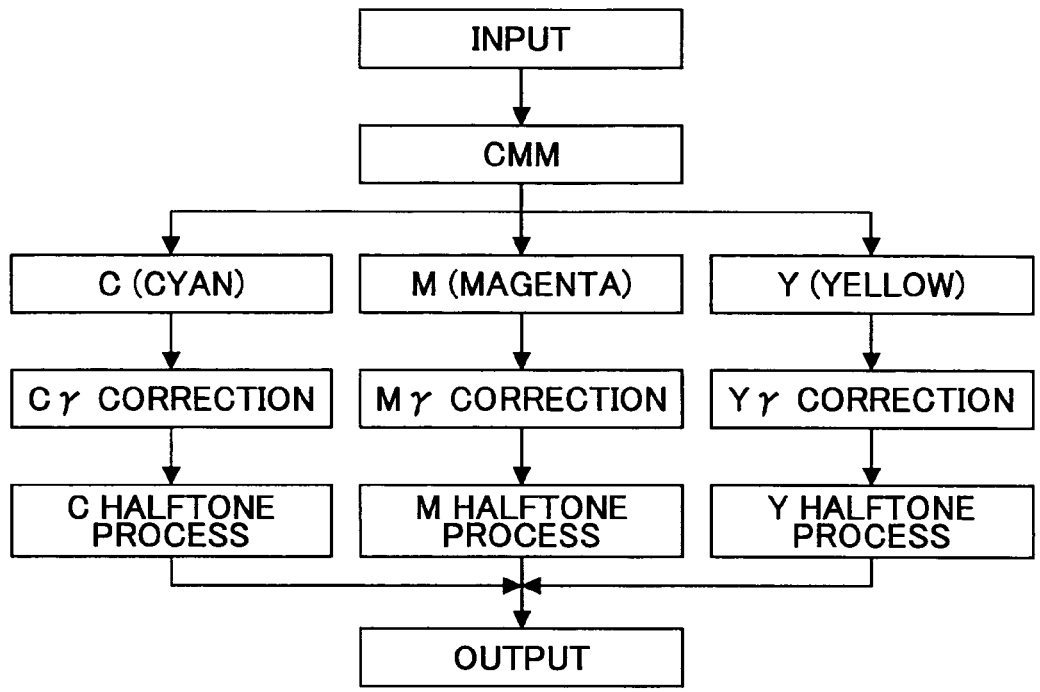
FIG. 16 is a flowchart for explaining a halftone process in a case where dots of each color are not disposed at the same positions.
Figure 17:
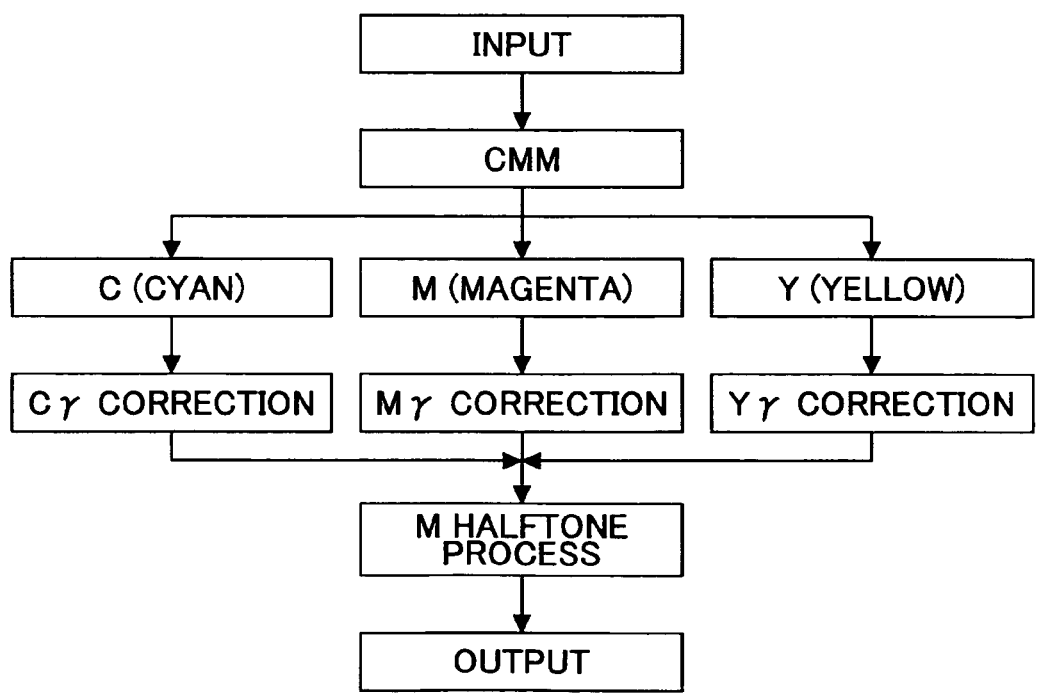
FIG. 17 is a flowchart for explaining a case where a dither method is employed as a halftone process according to an embodiment of the present invention.
Figure 18:
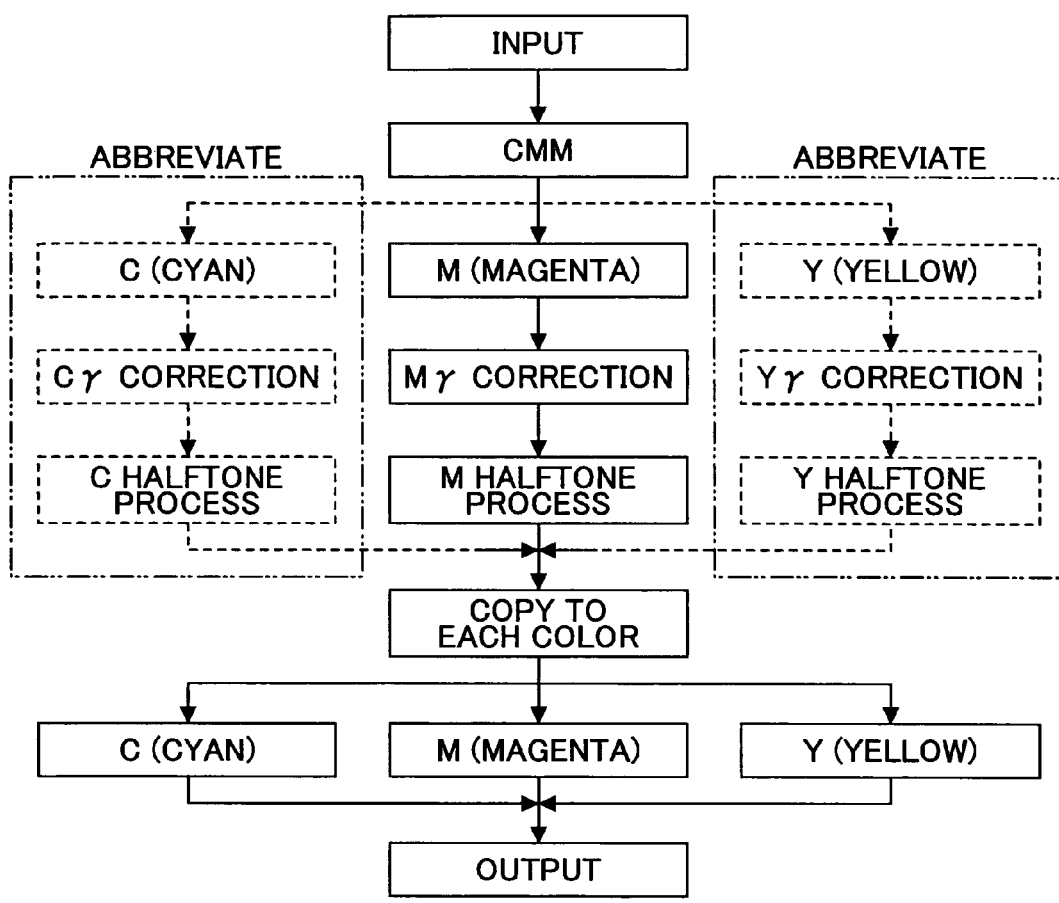
FIG. 18 is a flowchart for explaining a case where an error diffusion method is employed as a halftone process according to an embodiment of the present invention.

FIGS. 16-18 are flowcharts for describing how the present invention is applied with respect to the image processing flow shown in FIGS. 7 and 8.

First, FIG. 16 is a flowchart showing an image processing operation in a case where C, M, Y dots are not disposed at same positions. In this case, the CMM process part 131 performs a CMM process on input data and converts the input data to cyan (C), magenta (M), and yellow (Y) (black (K) is not described since this example does not use black ink). Then, the γ correction part 133 performs γ correction on C, M, and Y. Then, the halftone process part 134 performs a halftone process on C, M, Y. Then, C, M, and Y are output as output data.

Next, FIG. 17 is a flowchart showing an image processing operation in a case where C, M, Y dots are disposed at same positions and thus a dither method is employed as the halftone process. Since the dither method reproduces dots in accordance with the arrangement of the threshold matrix, composite black dots are automatically created by using a same dither mask for C, M, and Y. In this case, the CMM process part 131 performs a CMM process on input data and converts the input data to cyan (C), magenta (M), and yellow (Y) (black (K) is not described since this example does not use black ink). Then, the γ correction part 133 performs γ correction on C, M, and Y. Then, the halftone process part 134 performs a halftone process on C, M, Y by using a same dither mask. Then, C, M, and Y are output as output data.

FIG. 18 is a flowchart showing an image processing operation in a case where an error diffusion method is employed as the halftone process. In this case where error diffusion is employed, the dot arrangement pattern becomes different when noise is included in merely a single pixel. Therefore, in FIG. 18, data of magenta (M) is used as a representative value and is subject to processes including γ correction and halftone process. Then, the resultant data are copied to cyan (C) and yellow (Y), to thereby obtain a matching dot arrangement. Since the input data are "R=G=B", cyan or yellow may alternatively be employed as the representative value since a relation of "C≈M≈Y" is satisfied even after performing a CMM process. It is to be noted that the operation shown in FIG. 18 may be performed in a case where a dither method is alternatively employed as the halftone process.

That is, in this case, the CMM process part 131 performs a CMM process on input data and converts the input data to magenta (M) (C, Y, (K) abbreviated). Then, the γ correction part 133 performs γ correction on M. Then, the halftone process part 134 performs a halftone process on M. Then, the resultant data are copied to each color, to thereby output C, M, and Y data.

Figure 19:
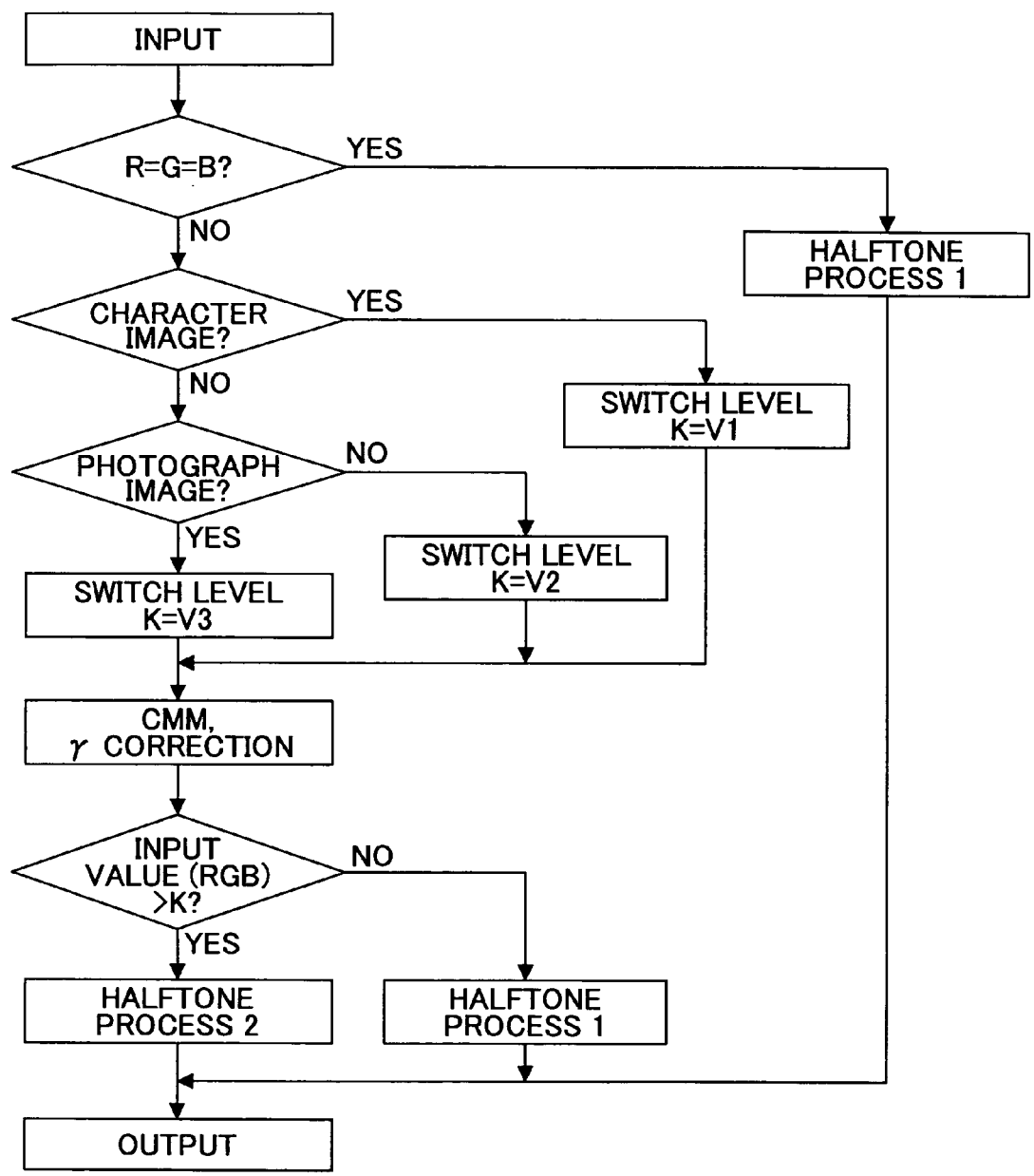
FIG. 19 is a flowchart for explaining an overall image processing operation according to an embodiment of the present invention.
Figure 20:
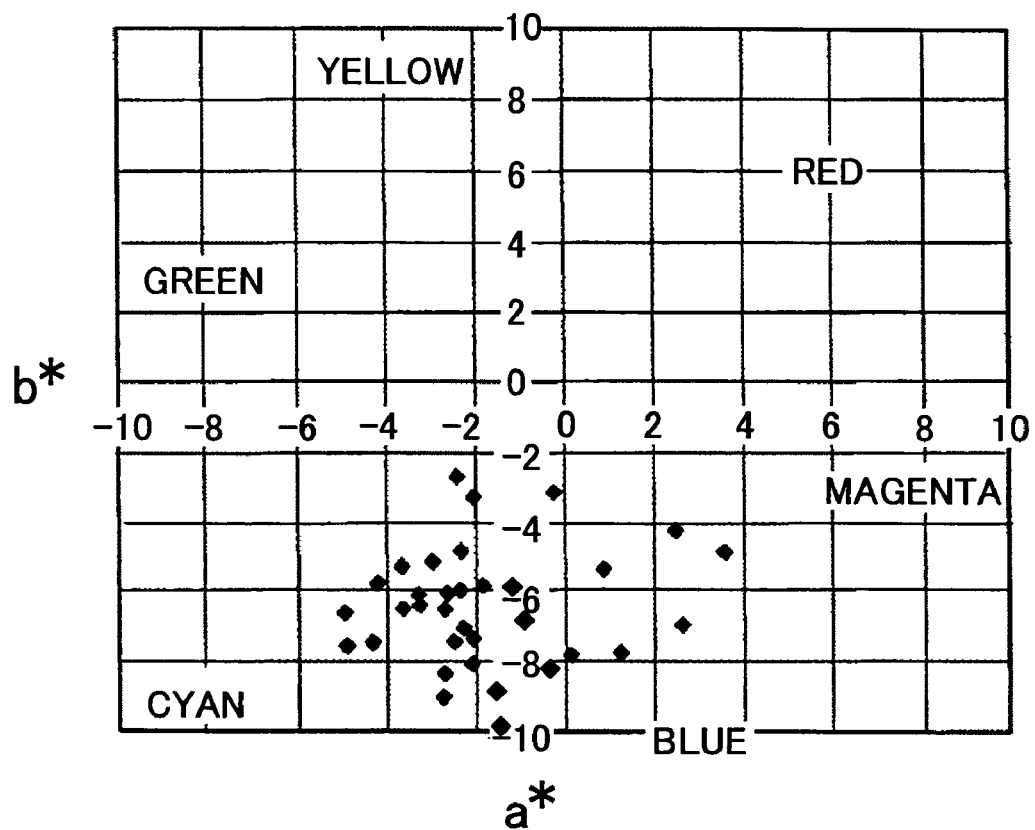
FIG. 20 is a diagram for explaining distribution of hue of composition black in each gradation level.

Next, a method of forming composite black according to an embodiment of the present invention is described with reference to FIG. 19.

First, it is determined whether the input data satisfy a relation of "R=G=B". If "R=G=B" is not satisfied, a first halftone process 1 is performed. The first halftone process 1 is performed separately on each color (C, M, Y) in the same manner as the halftone process shown in FIG. 16.

When the relation of "R=G=B" is satisfied, it is determined whether the target image (object) is a character image (text image). If the target image is a character image, the switch level is set to K=V1. If the target image is not a character image, it is determined whether the target image is a photograph image. If the target image is a photograph image, the switch level is set to K=V2. If the target image is neither a character image nor a photograph image, the switch level is set to K=V3. Here, the values (V1-V3), which are applied to the switch level K, are set to satisfy a relation of "V3≦V2≦V1" in correspondence with the above described relation of "graphics≦photograph≦character/line".

After performing a CMM process and a γ process on the input data, it determined whether the input value satisfies a relation of "input value (RGB)>K". If the relation of "input value (RGB)>K" is satisfied, a second halftone process 2 is performed. If the relation of "input value (RGB)>K" is not satisfied the first halftone process 1 is performed. It is to be noted that the second halftone process is the halftone process for forming 3K dots as shown in FIGS. 17 and 18.

Although the above-described example is described as using a combination of pigment type ink as black ink and dye type ink as C,M, Y ink, the example can obtain the same results by alternatively using a combination of pigment type ink optimum for plain paper as the black ink and a pigment type ink optimum for dedicated paper (including glossy paper) as the C, M, Y ink.

Furthermore, the present invention may be applied to OHP paper having a resin film as a base material. Since glossy paper having cardboard as a base material and OHP paper having a resin film as a base material are basically configured with no particular consideration for absorption of ink and are coated with an reception layer (glossy layer), the papers are subject to the same problems regarding pigment type ink.

Furthermore, although the aforementioned example is described in a mode that does not use black ink, the present invention also may be applied to a mode that uses black ink. In such a case, however, the advantages of the present invention may be less apparent since gray balance can be effectively adjusted by using black ink. For example, in a case where black ink is used as shown in Japanese Laid-Open Patent Application No.11-1128823, the present invention is effective since the area for reproducing composite black increases as the gradation level is shifted toward high density.

As described above, the present invention is effective when an ink having a prescribed composition is suitably applied to a paper of a prescribed type. Therefore, if the combination is known beforehand or if a paper type determining part of the recording apparatus is able to determine a suitable combination, the user can be free from having to select the combination if the 3K black operation shown in FIG. 19 is automatically initiated (entered).

That is, in a case where black is reproduced in correspondence with the recording mode that is determined depending on the type of paper or recording method, an optimum image process operation can be executed by switching between disposing and not disposing the dots in the same position. Furthermore, the user does not have to go through the trouble of selecting such a process.

However, there may also be a case where a user does not desire to use the image processing operation of the present invention. Accordingly, in addition to automatically executing the image processing operation of the present invention, a switching part for allowing the user to manually switch on/off the image processing operation of the present invention may be provided. The switching part may be provided, for example, on the control panel 117 of the image forming apparatus 1 or the printer driver 91 of the host 90 (data processing apparatus).

The image processing method according to the embodiment of the present invention may be performed entirely by using a program (printer driver) on a computer, as shown in FIG. 7, or by using as a part of a program on a computer and a part of hardware on the image forming apparatus, as shown in FIG. 8. Although not shown, the processes of the image processing method can be entirely performed as hardware with use of the image forming apparatus 1.

Furthermore, in a case where the image processing method according to the embodiment of the present invention is provided in the form of a program, the present invention can be mass distributed and reproduced by recording the program on inexpensive recording media. From the aspect of storage, the program can be stored for a long period by storing the program in a nonvolatile recording medium. Furthermore, since most computers are currently provided with floppy disk drives and CD/DVD drives, the program stored in the recording medium can be easily installed in computers.

It is to be noted that although an inkjet recording apparatus is employed to describe the present invention, other apparatuses such as a printer, a facsimile, a copier, or a complex machine provided with a printer, a facsimile, and/or a copier may alternatively be employed. Furthermore, an image forming apparatus using a recording liquid other than ink, a data processing apparatus supplying print data to the image forming apparatus, or a printer driver provided on the data process apparatus may be alternatively be employed.

Further, the present invention is not limited to these embodiments, but various variations and modifications may be made without departing from the scope of the present invention.

The present application is based on Japanese Priority Application Nos.2004-122361 and 2005-011018 filed on Apr. 19, 2004 and Jan. 19, 2005, respectively, with the Japanese Patent Office, the entire contents of which are hereby incorporated by reference.

What is claimed is:

1. An image forming apparatus for reproducing a black color by using an ink other than a black ink, or by mixing the black ink with the ink other than the black ink, when recording an image on a recording medium based on RGB image data input to the image forming apparatus, the image forming apparatus comprising:

an image processing part for disposing dots of multiple colors in various gradation levels, the image processing part being configured to convert the RGB image data to CMY image data and dispose the dots of each color in a predetermined gradation level at a same position in each case where the RGB image data satisfies a relationship of R=G=B, wherein the dots of each color maintain the same position even in different gradation levels.

2. The image forming apparatus as claimed in claim 1, wherein the image processing part is configured to adjust the position of the dots in accordance with target input image data.

3. The image forming apparatus as claimed in claim 2, wherein the target input image data include a graphic image, a photograph image, and a character/linear image, wherein the image processing part shifts the predetermined gradation level toward high density, wherein the density of the predetermined gradation level becomes higher in an order of graphic image≦photograph image≦character/linear image.

4. The image forming apparatus as claimed in 1, wherein the image processing part is configured to dispose the dots of each color in a predetermined gradation level at a same position in response to a request communicated to the image forming apparatus from a host.

5. The image forming apparatus as claimed in claim 1, wherein the image processing part is configured to dispose the dots of each color in a predetermined gradation level at a same position in accordance with at least one of type of recording medium or a recording method.

6. The image forming apparatus as claimed in claim 1, wherein the image processing part is configured to dispose the dots of each color in a predetermined gradation level at a same position in a case where the black ink has an insufficient fixing property with respect to the recording medium.

7. The image forming apparatus as claimed in claim 1, wherein the image processing part is configured to dispose the dots of each color in a predetermined gradation level at a same position in a case where the ink is a pigment type ink and the recording medium is at least one of a glossy paper or an OHP paper.

8. The image forming apparatus as claimed in claim 1, wherein composite black dots are formed by said image processing part by disposing the dots of the multiple respective colors at the same position.

9. The image forming apparatus as claimed in claim 8, wherein said composite black dots have a fixed hue in which gray balance does not differ in the different gradation levels of the respective composite black dots.

10. An image processing method for reproducing a black color by using an ink other than a black ink, or by mixing the black ink with the ink other than the black ink, when recording an image on a recording medium, based on input RGB image data, the image processing method comprising:

an image processing step for disposing dots of multiple colors in various gradation levels, the image processing step including the steps of convening the RGB image data to CMY image data and disposing the dots of each color in a predetermined gradation level at a same position in each case where the image data satisfies a relationship of R=G=B, wherein the dots of each color maintain the same position even in different gradation levels.

11. The image processing method as claimed in claim 10, wherein the image processing step includes a step of adjusting the position of the dots in accordance with target input image data.

12. The image processing method as claimed in claim 11, wherein the target input image data include a graphic image, a photograph image, and a character/linear image. wherein the image processing step shifts the predetermined gradation level toward high density, wherein the density of the predetermined gradation level becomes higher in an order of graphic image≦photograph image≦character/linear image.

13. The image processing method as claimed in 10, wherein the image processing step includes a step of disposing the dots of each color in a predetermined gradation level at a same position in response to a request from a user using the image processing method.

14. The image processing method as claimed in claim 10, wherein the image processing step includes a step of disposing the dots of each color in a predetermined gradation level at a same position in accordance with at least one of type of recording medium or a recording method.

15. The image processing method as claimed in claim 10, wherein the image processing step includes a step of disposing the dots of each color in a predetermined gradation level at a same position in a case where the black ink has an insufficient fixing property with respect to the recording medium.

16. The image processing method as claimed in claim 10, wherein the image processing step includes a step of disposing the dots of each color in a predetermined gradation level at a same position in a case where the ink is a pigment type ink and the recording medium is at least one of a glossy paper or an OHP paper.

17. A printer driver for outputting image data to an image forming apparatus for reproducing a black color by using an ink other than a black ink, or by mixing the black ink with the ink other than the black ink, when recording an image on a recording medium based on RGB image data input to the image forming apparatus, the printer driver comprising:

an image processing part for disposing dots of multiple colors in various gradation levels, the image processing part being configured to convert the RGB image data to CMY image data and dispose the dots of each color in a predetermined gradation level at a same position in each case where the image data satisfies a relationship of R=G=B, wherein the dots of each color maintain the same position even in different gradation levels.

* * * * *